Sept. 13, 1949.  F. ROSENBERG  2,481,950
BLOWPIPE
Filed July 12, 1944
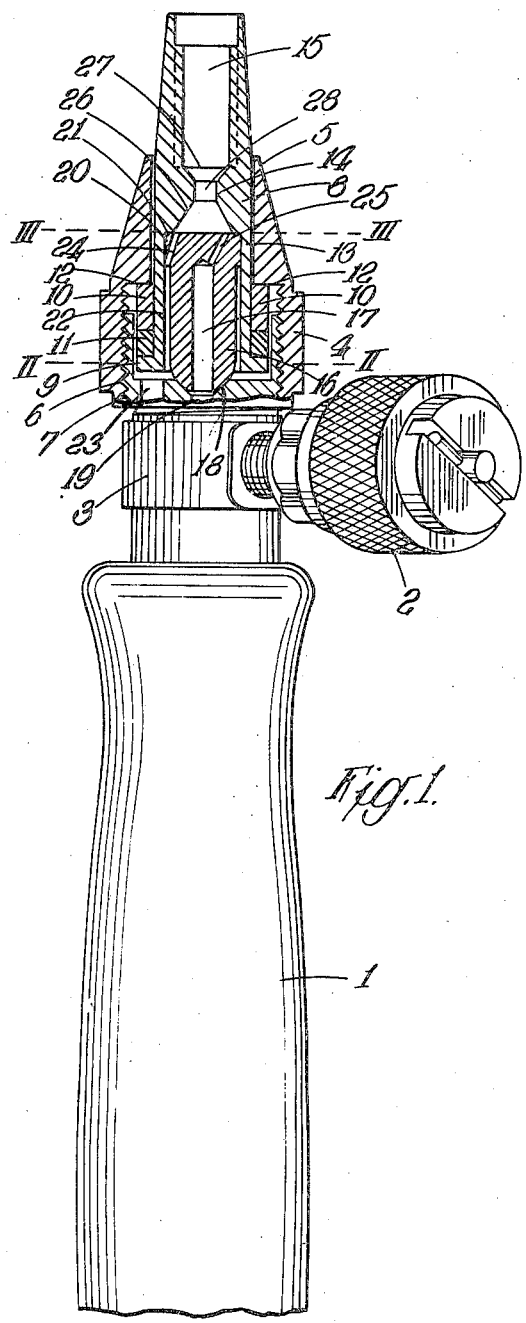
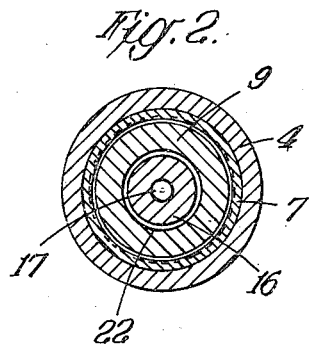
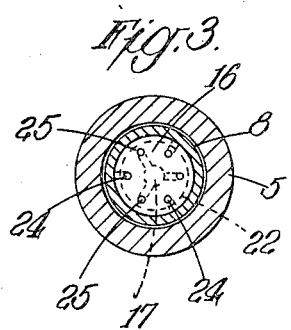
Inventor,
Frederick Rosenberg
By Young, Emery & Thompson
Attys.

Patented Sept. 13, 1949

2,481,950

UNITED STATES PATENT OFFICE 2,481,950

BLOWPIPE

Frederick Rosenberg, London, England, assignor to Suffolk Iron Foundry (1920) Ltd., Stowmarket, England, a British company Application July 12, 1944, Serial No. 544,528
In Great Britain July 29, 1943

11 Claims. (Cl. 158—27.4)

This invention relates to blowpipes of the type in which two or more gases are employed to produce a combustible mixture for the operation required. When operating such pipes it is usual to lead the gases separately from independent sources to a mixing chamber which in general is associated with the blowpipe handle and usually is situated at the nozzle end thereof.

The present invention has for its object to provide improved mixing means enabling an intimate mixture of the gases to be obtained in association with a mixing chamber which affords in addition a high degree of security against backfiring.

According to the invention the conduits through which the gases are led to the mixing chamber are arranged in the form of concentric passages from each of which two or more ducts convey the gas obliquely to the axial direction of said passages into the mixing chamber which is shaped to increase the intimacy of the mixture already produced by the discharge of the ducts aforesaid.

In the simplest and most common case where only two gases have to be mixed, the concentric passages take the form of an axial bore and a surrounding annular passage and the ducts leading therefrom into the mixing chamber are inclined respectively outwardly and inwardly with their outlets preferably terminating in a plane and on a circle which is concentric with the passages.

A blowpipe embodying a practical form of the invention is illustrated by way of example in the accompanying drawing in which Fig. 1 shows a central longitudinal section of the nozzle of the blowpipe which is attached to the customary handle here shown in elevation;

Fig. 2 is a transverse section on the line II—II of Fig. 1, and

Fig. 3 is a cross section on the line III—III of Fig. 1.

The blowpipe shown is provided with the usual handle 1 by way of which under the control of regulating valves 2 the two gases, i. e. oxygen and acetylene are admitted through a socket 3 to the mixing nozzle of the pipe. This nozzle comprises an outer housing composed of a main conical socket 5 and a cylindrical portion 4 which is provided with an internal screw thread 6 adapted to be screwed on to a threaded nipple 7 which forms part of the handle socket 3. Arranged concentrically within this outer housing is a substantially cylindrical sleeve 8 the inner end of which carries a cylindrical flange 9 bearing against a ring shaped member 10 by means of an interposed rubber or like packing ring 11. The ring 10 is supported on its outer face on an interior shoulder 12 within the conical nozzle portion 5. The sleeve 8 has its interior adapted to form a mixing chamber which as shown in the example illustrated is composed of a main cylindrical portion 13 and a throatlike intermediate portion 14 leading to an outer cylindrical portion 15 which forms the outlet proper of the nozzle. Removably fitted within the cylindrical portion 13 is a cylindrical plug 16 which is provided with a central axial bore 17. The inner end of this plug is rounded and adapted to lodge within a central cavity 18 in the nipple 7 where it communicates with a central passage 19 provided for the admission thereto of one of the gases. The outer end of the plug 16 is provided with a collar 20 bearing on a shoulder 21 within the sleeve 8 by which the outer end of the cylindrical portion 13 is confined. The remaining portion of the plug extending inwardly from the collar 20 is of a slightly reduced diameter so as to form between it and the inner cylindrical surface of the main portion 13 an annular passage 22 the inner end of which communicates with the passage 23 formed in juxtaposition with the passage 19 within the nipple 7 for the admission of the second gas to the nozzle. Provided within the collar 20 of the plug 16 are ducts 24 and 25 there being three ducts 24 connecting the annular passage 22 and three ducts 25 connecting the central axial passage 17 with the throatlike portion 14 of the mixing chamber. As will be seen the ducts 24 are inclined inwardly from the annular passage 22 while the ducts 25 are inclined outwardly from the central passage 17. The upper terminal ends of these ducts all lie in the upper end face of the plug collar 20 and, therefore, in a common transverse plane coinciding with that of the restricted opening presented by the adjoining lower end of the waist shaped cavity 14. The said terminal ends are arranged to alternate one with the other around a circle whose center coincides with the axis of the cavity 14. This cavity 14 forming the mixing chamber proper consists in this instance, as illustrated, of two inversely inverted cones 26 and 27 connected at their tapered ends by a cylindrical portion 28 the portion 27 leading to the outlet 15 proper of the nozzle.

With this arrangement therefore it will be seen that the two gases admitted separately into the nozzle by way of the passages 19 and 23 are delivered in alternating jets to the mixing cone 26 through the oppositely inclined ducts 24, 25 thereby compelling them to form an intimate mixture the intimacy of which is enhanced by the impingement of these jets upon the tapering walls of the cone 26 of the mixing chamber before passing out through the cylindrical outlet 15. The plug 16 as has been described is readily removable enabling therefore easy cleaning and if necessary its replacement.

As will be appreciated by those skilled in the art a very efficient mixture is obtainable by this arrangement which latter however should not be deemed to be limited to the precise construction hereinbefore explained by reference to the drawings but may be varied in its details without departing from the spirit of the invention as herein defined.

I claim:

1. In a blowpipe of the kind employing at least two gases for producing a combustible mixture, the combination of a handle socket having means defining separate gas inlet passages therein and a gas mixing nozzle secured to said handle socket, said mixing nozzle having internal wall surfaces defining a frusto-conical gas-mixing chamber, a gas outlet orifice in axial alignment with and forming a continuation of the smaller diameter end of said chamber, a first series of ducts leading from one of said gas inlet passages to the larger diameter end wall of said frusto-conical mixing chamber, and a second series of ducts leading from another of said gas inlet passages to said larger diameter end wall of said mixing chamber, the ducts of one series being inclined with respect to the common axis of the mixing chamber and the outlet orifice and so oriented as to direct each of the separate streams of gas flowing therefrom on to different points of the convergent wall surface of said mixing chamber for deflection thereby towards and through said outlet orifice and the ducts of the other series being similarly inclined but in a mutually opposite direction with respect to said common axis and so oriented as to direct each of the further separate streams of gas flowing therefrom on to further different points of said convergent wall surface for deflection thereby towards and through said outlet orifice so that the respective streams from said two series of ducts are caused to cross and intermingle.

2. In a blowpipe of the kind employing at least two gases for producing a combustible mixture, the combination of a handle socket having means defining separate inlet passages therein for the admission of the respective gases to the socket, and a gas mixing nozzle secured to said socket, said mixing nozzle being provided with means defining an axial outlet for the combustible gas mixture, with other means defining an axial frusto-conical mixing chamber arranged at the inner end of said axial outlet so that the walls of said mixing chamber flare outwards towards the socket end of said nozzle, with further means defining inner and outer concentric passages connected respectively to said inlet passages in said socket, and with still further means defining at least one series of ducts leading from each concentric passage to said mixing chamber, said ducts being inclined obliquely to the axis of said mixing chamber with the ducts from one passage oppositely inclined to the ducts from the other passage so that the separate streams of gases from said ducts impinge upon the flared wall of the said mixing chamber at different points thereof and are deflected thereby towards the axial outlet in said nozzle in a manner causing the streams to cross and intermingle.

3. In a blowpipe of the kind employing at least two gases for producing a combustible mixture, the combination of a handle socket having means defining separate inlet passages therein for the admission of the respective gases to the socket, and a gas mixing nozzle secured to said socket, said mixing nozzle being provided with means defining an axial outlet bore for the combustible gas mixture, with other means defining inner and outer concentric axial inlet bores connected respectively with said inlet passages for the admission of the separate gases, with further means defining a frusto-conical mixing chamber connected to the inner end of the axial outlet bore so that its walls flare outwards towards the socket end of the mixing nozzle, and with still further means defining a series of ducts leading from each said concentric passage to said mixing chamber, said ducts being inclined obliquely to the axis of said mixing chamber with the ducts from one concentric passage inclined oppositely to and alternating with the ducts from the other concentric passage and terminating in a common plane at right angles to the axis of said chamber so that the separate streams of gases from said ducts impinge upon the flared wall of the said mixing chamber at different points thereof and are then deflected thereby towards the axial outlet in said nozzle in a manner causing the streams to cross and intermingle.

4. In a blowpipe of the kind employing at least two gases for producing a combustible mixture, the combination of a handle socket having means defining separate inlet passages therein for the admission of the respective gases to the socket, and a gas mixing nozzle secured to said socket, said mixing nozzle having wall surfaces therein defining a cylindrical axial bore with a throat of reduced diameter intermediate the ends of said bore and a frusto-conical mixing chamber connecting said throat to the socket end of said axial nozzle bore, and a plug inserted in the socket end of said nozzle, said plug having a plane end which defines a plane end surface of said mixing chamber, wall surfaces defining an axial bore for connection to one of said gas admission passages in said socket, an outer peripheral portion of reduced diameter to define an annular passage concentric with said axial bore in said plug for connection to another of said gas admission passages in said socket, and internal wall surfaces defining one set of circumferentially disposed ducts obliquely inclined to the axis of the concentric passages and divergingly leading from one of said concentric passages to open into the top plane end surface of said plug and a second set of circumferentially disposed ducts alternating with the ducts of the aforesaid set and obliquely inclined to the axis of the concentric passages and convergingly leading from the other of said concentric passages to open into the top plane end surface of said plug so that the separate streams of gases from said ducts impinge upon the flared wall of the said mixing chamber at different points thereof and are deflected thereby towards the axial outlet in said nozzle in a manner causing the streams to cross and intermingle.

5. In a blowpipe of the kind employing at least two gases for producing a combustible mixture, the combination of a handle socket having wall surfaces defining gas admission openings therein, and a gas mixing nozzle comprising a housing shaped as a main conical socket and a coupling sleeve engaging said handle socket, a tubular nozzle member set in said nozzle socket, the bore of said nozzle member being formed as a main cylindrical portion at the socket end thereof, a cylindrical outlet portion and walls defining a co-axial frusto-conical mixing chamber which tapers inwards from said main cylindrical portion of said bore to join a co-axial passage or throat leading to said outlet portion of said bore, and a removable cylindrical plug inserted in said main portion of said nozzle bore, said plug having wall therein defining an axial passage connecting with one of said gas admission openings in said handle socket, and a portion of its outer periphery reduced in diameter to define between said plug and the wall of said tubular nozzle member an annular passage concentric with said axial bore in said plug and connecting with another of said gas admission openings in said handle socket, and further internal wall surfaces defining one set of circumferentially disposed ducts obliquely inclined to the axis of the concentric passages and divergingly leading from one of said concentric passages to open into the top plane end surface of said plug and a second set of circumferentially disposed ducts alternating with the ducts of the aforesaid set and obliquely inclined to the axis of the concentric passages and convergingly leading from the other of said concentric passages to open into the top plane end surface of said plug so that the separate streams of gases from said ducts impinge upon the flared wall of the said mixing chamber at different points thereof and are deflected thereby towards the axial outlet in said nozzle in a manner causing the streams to cross and intermingle.

6. The combination claimed in claim 1, in which the means defining said obliquely inclined ducts comprises wall surfaces in a removable plug inserted in the socket end of said nozzle.

7. The combination claimed in claim 2, in which the means defining said concentric passage and the means defining said oblique ducts comprise wall surfaces in a removable plug inserted in the socket end of said nozzle.

8. The combination claimed in claim 3, in which said common termination plane is constituted by the end surface of a removable plug inserted in the socket end of said nozzle, said plug being also provided with wall surfaces constituting said means defining said concentric passages and said means defining said obliquely inclined ducts opening into said plane surface.

9. In a blowpipe of the kind employing at least two gases for producing a combustible mixture, the combination of a handle socket having wall surfaces defining separate inlet passages therein for the admission of the respective gases to the socket, a gas mixing nozzle secured to said socket, said mixing nozzle being provided with wall surfaces defining an axial outlet for the combustible gas mixture and other wall surfaces defining an axial frusto-conical mixing chamber arranged at the inner end of said axial outlet so that the walls of said chamber flare outwards towards the socket end of said nozzle and a removable plug inserted between the handle socket and the gas-mixing nozzle, said plug having internal wall surfaces defining a blind centre hole leading to one of the gas outlets in the socket and a reduced diameter outer peripheral wall surface forming an annular space in conjunction with a wall surface of said mixing nozzle and leaving a head portion abutting in gas-tight manner against a shoulder in said chamber, said plug having internal walls defining one set of circumferentially disposed ducts obliquely inclined to the axis of the center hole and divergingly leading from said center hole to the mixing chamber and a second set of circumferentially disposed ducts alternating with the ducts of the aforesaid set and obliquely inclined to the axis of said center hole and convergingly leading from said annular space to the mixing chamber so that the separate streams of gases from said ducts impinge upon the flared wall of said mixing chamber at different points thereof, the inclined angle between these gas streams and the wall of the frusto-conical mixing chamber being such that the streams of gases are deflected thereby so as to cross and intermingle and then flow towards the axial outlet in said nozzle.

10. In a blow pipe of the kind employing at least two gases for producing a combustible mixture, the combination of a handle socket having means defining separate inlet passages therein for the admission of the respective gases to the socket, a gas mixing nozzle secured to said socket, said mixing nozzle having means defining an axial outlet for the combustible gas mixture and having further means defining an axial frusto-conical mixing chamber arranged at the inner end of said axial outlet and having walls which flare outwards towards the socket end of said nozzle, a removable plug inserted between the handle socket and the gas mixing nozzle, said plug having means defining a blind axial hole leading to one of the inlet passages in said handle socket and means defining an annular space around an inwardly disposed portion of its body leading to the second of the inlet passages in said handle socket, means defining one set of circumferentially disposed ducts obliquely inclined to the axis of the center hole and divergingly leading from said center hole to the mixing chamber and a second set of circumferentially disposed ducts alternating with the ducts of the aforesaid set and obliquely inclined to the axis of said center hole and convergingly leading from said annular space to the mixing chamber, each of said ducts being directed so that the gases issuing therefrom impinge against said flared walls and intermingle with one another and flow towards said axial outlet without further deflection by said flared walls.

11. In a blow pipe employing two gases for producing a combustible mixture, a gas mixing nozzle structure comprising wall surfaces defining a frusto-conical shaped gas mixing chamber, a gas outlet orifice in axial alignment with and forming a continuation of the smaller diameter end of said mixing chamber, a first gas supply passage coaxial with said mixing chamber and said outlet orifice and located beyond the larger diameter end wall of said mixing chamber on the side thereof opposite to that of the outlet orifice, a second gas supply passage in the form of an annular chamber surrounding and coaxial with said first supply passage, a first series of ducts leading from said first supply passage to the larger diameter end wall of said mixing chamber, said ducts being disposed to constitute a cone of spaced divergent jets which impinge at separated points upon the convergent wall of said mixing chamber and are deflected therefrom towards and through said outlet orifice, and a second series of ducts leading from said second supply passage to the larger diameter end wall of said mixing chamber, said second series of ducts being disposed to constitute a cone of spaced convergent jets, alternating with those of the first series of ducts, and which impinge at separated points intermediate those of impingement of the first series of ducts upon said convergent wall of the mixing chamber and are deflected therefrom towards and through said outlet orifice whereby the two series of jets cross one another and intermingle during their respective passage through the outlet orifice.

FREDERICK ROSENBERG.

REFERENCES CITED

The following references are of record in the file of this patent:

UNITED STATES PATENTS

| Number | Name | Date |
|---|---|---|
| 1,066,192 | Fausek | July 1, 1913 |
| 1,384,224 | Allison et al. | July 12, 1921 |
| 1,465,390 | Frank | Aug. 21, 1923 |
| 1,481,535 | Burdett | Jan. 22, 1924 |
| 1,808,968 | Plumley | June 9, 1931 |
| 1,907,604 | Stephenson | May 9, 1933 |
| 2,164,256 | Peterson | June 27, 1939 |

FOREIGN PATENTS

| Number | Country | Date |
|---|---|---|
| 76,691 | Austria | June 10, 1919 |
| 374,844 | Germany | Apr. 30, 1923 |
| 653,089 | France | Oct. 30, 1928 |